(12) United States Patent
Rushing

(10) Patent No.: US 8,947,205 B2
(45) Date of Patent: Feb. 3, 2015

(54) SYSTEM, METHOD AND MONUMENT FOR LAND SURVEYING

(75) Inventor: William C. Rushing, Sun Prairie, WI (US)

(73) Assignee: Berntsen International, Inc., Madison, WI (US)

( * ) Notice: Subject to any disclaimer, the term of this patent is extended or adjusted under 35 U.S.C. 154(b) by 698 days.

(21) Appl. No.: 12/784,918

(22) Filed: May 21, 2010

(65) Prior Publication Data

US 2010/0295699 A1 Nov. 25, 2010

Related U.S. Application Data

(60) Provisional application No. 61/180,562, filed on May 22, 2009, provisional application No. 61/224,297, filed on Jul. 9, 2009.

(51) Int. Cl.
*H01Q 7/08* (2006.01)
*G08B 5/22* (2006.01)
*G01C 15/04* (2006.01)
*G08B 13/24* (2006.01)

(52) U.S. Cl.
CPC ............ *G01C 15/04* (2013.01); *G08B 13/2417* (2013.01); *G08B 13/2477* (2013.01)
USPC ....... 340/8.1; 340/572.8; 340/10.1; 340/10.5; 340/652

(58) Field of Classification Search
CPC .................................. H01Q 7/08; G08B 5/22
USPC ............ 340/8.1, 572.8, 568, 571, 10.1, 10.5, 340/652; 342/357.48, 357.62, 357.4; 52/103
See application file for complete search history.

(56) References Cited

U.S. PATENT DOCUMENTS

| | | | | |
|---|---|---|---|---|
| 3,517,316 A | * | 6/1970 | Hatcher et al. | 340/525 |
| 3,665,511 A | | 5/1972 | Wolf | |
| 3,836,842 A | * | 9/1974 | Zimmermann et al. | 324/239 |
| 4,441,288 A | | 4/1984 | Feldman et al. | |
| 4,811,030 A | * | 3/1989 | Pedersen | 343/788 |
| 5,148,641 A | * | 9/1992 | Rushing et al. | 52/103 |
| 5,689,238 A | * | 11/1997 | Cannon et al. | 340/572.1 |
| 5,739,785 A | | 4/1998 | Allison et al. | |
| 5,825,298 A | | 10/1998 | Walter | |
| 6,137,413 A | * | 10/2000 | Ryan, Jr. | 340/572.8 |
| 6,377,176 B1 | | 4/2002 | Lee | |
| 6,939,290 B2 | * | 9/2005 | Iddan | 600/109 |
| 6,958,034 B2 | * | 10/2005 | Iddan | 600/114 |
| 7,256,699 B2 | * | 8/2007 | Tethrake et al. | 340/572.8 |

(Continued)

OTHER PUBLICATIONS

International Search Report for International Application No. PCT/US10/035768 dated Jul. 20, 2010.

(Continued)

*Primary Examiner* — Nam V Nguyen
(74) *Attorney, Agent, or Firm* — Boardman & Clark LLP

(57) ABSTRACT

A monument usable for locating stationary geographical positions and/or assets includes a housing, comprising a body and a cap; at least one permanent magnet mounted on or in the housing; and at least one electronic marker located on or in the housing. The magnet has a magnetic field of sufficient strength for its location to be readily identified from outside the housing using a portable magnetic locator and the electronic marker includes an electronic transceiver for receiving and/or transmitting electronic information unique to the geographical location and/or functional properties of the monument or an asset associated with the monument.

4 Claims, 9 Drawing Sheets

(56) References Cited

U.S. PATENT DOCUMENTS

| | | |
|---|---|---|
| 7,345,486 B2 | 3/2008 | Mercer |
| 7,830,260 B2 * | 11/2010 | Wang et al. ............... 340/572.1 |
| 7,896,742 B2 * | 3/2011 | Weston et al. .................. 463/37 |
| 7,969,295 B2 * | 6/2011 | Colvero et al. ............... 340/505 |
| 8,162,821 B2 * | 4/2012 | Kawano et al. .............. 600/117 |
| 8,183,979 B2 * | 5/2012 | Squibbs et al. ............... 340/5.8 |
| 8,289,144 B2 * | 10/2012 | Zhu et al. ...................... 340/447 |
| 8,289,167 B2 * | 10/2012 | Bauchot et al. ............. 340/572.8 |
| 2003/0020810 A1 * | 1/2003 | Takizawa et al. ............... 348/68 |
| 2004/0140900 A1 * | 7/2004 | Barber et al. ............... 340/573.2 |
| 2004/0250819 A1 | 12/2004 | Blair et al. |
| 2006/0124740 A1 | 6/2006 | Woodard et al. |
| 2006/0220955 A1 * | 10/2006 | Hamilton ................. 342/357.13 |
| 2007/0120690 A1 | 5/2007 | Barber et al. |
| 2008/0055094 A1 | 3/2008 | Barber et al. |
| 2008/0262885 A1 | 10/2008 | Jain et al. |
| 2009/0140852 A1 | 6/2009 | Stolarczyk et al. |
| 2009/0201154 A1 | 8/2009 | Bauchot et al. |

OTHER PUBLICATIONS

"For a smart environment, smart survey monuments", Bill Rushing, ACSM Bulletin, Feb. 2010.

"3M ScotchMark Locating and Marking Products", 3M Innovation, Corrosion Protection Department, 1999.

"3M Dynatel Locating and Marking Electronic Starker System" 3M Innovation, Track and Trace Solutions, 2008.

* cited by examiner

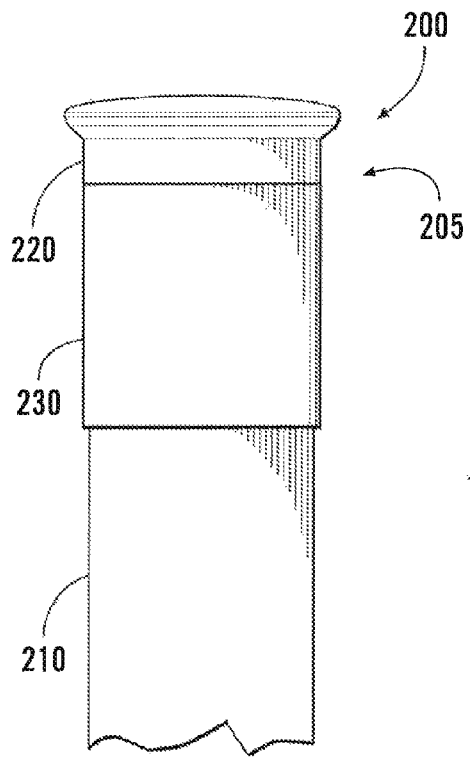
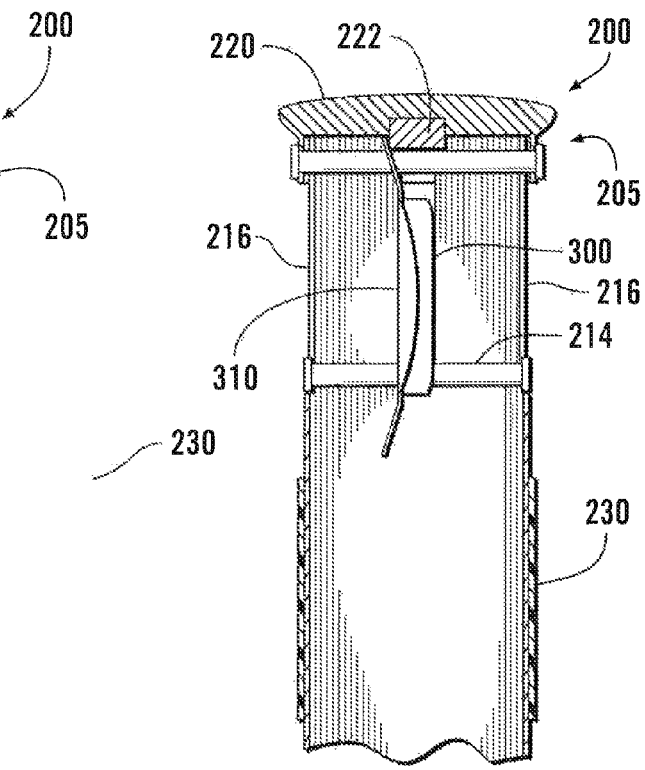
FIG. 2  FIG. 3
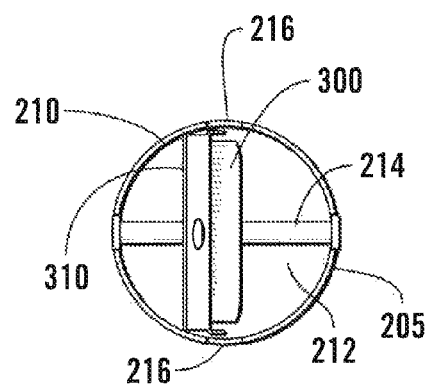
FIG. 4

SYSTEM, METHOD AND MONUMENT FOR LAND SURVEYING

This application claims priority to U.S. Provisional Application No. 61/180,562, filed May 22, 2009, and U.S. Provisional Application No. 61/224,297 filed Jul. 9, 2009, which are incorporated herein by reference in their entirety.

BACKGROUND

1. Field of the Invention

This invention is related to systems, methods and structures usable in surveying or geographic information sciences.

2. Related Art

Surveyors have been using monuments to at least semi-permanently mark geographic positions for many years. Traditional survey monuments have been made of granite, concrete, wood and/or metal. Traditional survey monuments may include a large permanent magnet. The large permanent magnet allows a surveyor to locate the monument using a magnetic locator, such as those available from Schonstedt Instrument Company of Kearneysville, W. Va.

SUMMARY OF THE DISCLOSED EMBODIMENTS

While traditional survey monuments are useful for marking a physical location, they typically are not useful for storing or providing any further information. For example, while the survey monument may be adorned with various text and/or insignia that can identify the monument and/or the surveyor who placed the monument, this information may not be available without removing the monument from the ground and/or displacing the soil around the monument. Not only can this be difficult and time consuming, it also presents a possibility of the monument being moved and/or loosened from its position and/or orientation. Likewise, simple engraved information (e.g., text, insignia, etc), can be forged with simple engraving tools and thus may not be reliably accurate.

Further, it can be difficult to identify one survey monument from another, or even from other metallic and/or ferrous objects. For example, metal conduits, unexploded ordinance, buried metal (e.g., rebar) and other objects that are often buried under ground, can present difficulty when trying to locate a survey monument. If such objects are buried near a survey monument and exhibit a magnetic field, they may be confused for the survey monument when attempting to locate the monument with a magnetic locator. As such, a surveyor, or any other individual attempting to locate the monument for the purpose of geographic reference, may be mislead to believe that the survey monument is located in a different place than it actually is.

Misidentifying a desired monument (e.g., erroneously locating the wrong monument or erroneously identifying a non-monument, ferrous object as the desired monument), can result in various safety, legal and/or other problems. If, for example, an individual attempts to locate a monument as a point of reference for determining safe and/or unsafe digging locations, a misidentified monument may result in an unsafe location being deemed safe and vice-versa. Likewise, a misidentified monument may result in a landowner miscalculating a boundary line of a property.

Additionally, as outlined above, traditional survey monuments generally include simple engraved markings and/or insignia, if they include any markings at all. These traditional markings and/or insignia may not be useful for updating any information associated with the survey monument and/or may be limited in the amount or the type of information that can be shown. For example, traditional survey monuments may be engraved with a serial number and/or a name or insignia of the individual or organization that placed the survey monument. This information alone may have only limited usability and may not be readily accessible if the survey monument is buried below ground.

In various exemplary embodiments, a survey monument according to this invention can be readily identified in relation to other survey monuments and/or nearby ferrous objects. In various exemplary embodiments, the survey monument can be readily identified without requiring a line of sight between the user and the survey monument. In various exemplary embodiments, the survey monument can be uniquely identified.

In various exemplary embodiments, the survey monument is usable to at least help store information about the survey monument and/or a location around the survey monument. In various ones of these exemplary embodiments, the information includes an identification number that correlates to one or more data entries in one or more databases.

In various exemplary embodiments, the survey monument has a main body that is primarily metal. In various ones of these exemplary embodiments, at least a portion of the main body is permeable to RF signals within a desired range of wavelengths.

In various exemplary embodiments of a survey system according to this invention, the survey system includes a survey monument, an electronic reader and a server. In various exemplary embodiments, the server includes a database that stores information associated with one or more survey monuments.

In various exemplary embodiments of a survey system according to this invention, the survey system includes one or more survey monuments, each having one or more electronic tags, a reader usable to read the one or more electronic tags of the one or more survey monuments and a server that includes a database usable to store information associated with at least one of the one or more survey monuments. In various exemplary embodiments, a user uses the reader to identify a survey monument to determine if it is a desired survey monument. In various exemplary embodiments, the reader may then send identifying information of the identified survey monument to the server. In return, the server may send at least some of the information associated with the identified survey monument to the reader to display to the user.

In various exemplary embodiments, the reader may interact with the electronic tag and/or the server with a two-way communication stream. For example, the reader may send information (e.g., data queries) and receive information back from the electronic tag or server (e.g., alphanumeric data responses). Additionally, the reader may include a transceiver for interacting with the electronic tag and a separate processor for processing the data received from the electronic tag and/or server. The transceiver and the processor may be connected via suitable known or later-developed wired or wireless communication bus or protocol.

These and other features and advantages of various exemplary embodiments of systems and methods according to this invention are described in, or are apparent from, the following detailed descriptions of various exemplary embodiments of various devices, structures and/or methods according to this invention.

BRIEF DESCRIPTION OF DRAWINGS

Various exemplary embodiments of the systems and methods according to this invention will be described in detail, with reference to the following figures, wherein:

FIG. 2 is a side plan view of an exemplary monument fitted with an, electronic tag according to an exemplary embodiment;

FIG. 3 is a side cross-sectional view of the monument shown in FIG. 2 with the collar 230 positioned to expose an electronic tag;

FIG. 4 is a top plan view of the monument shown in FIG. 3 with the cap removed;

DETAILED DESCRIPTION OF EXEMPLARY EMBODIMENTS

Figure 1:
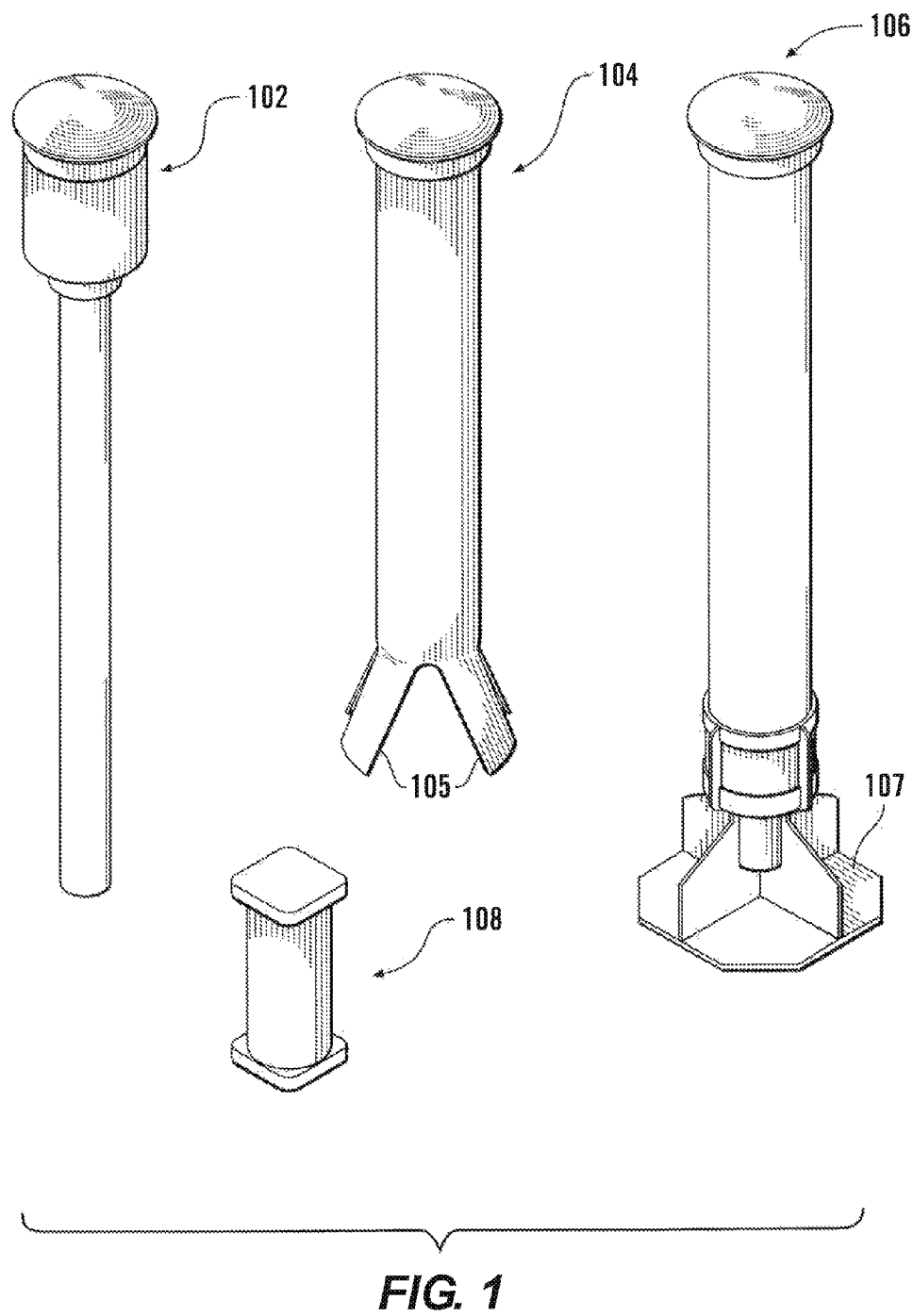
FIG. 1 is a series of perspective views of survey monuments according to exemplary embodiments.

The following description relates to monuments usable as geographic markers (e.g., to mark the location of an asset). Generally, the monuments are provided at a substantially fixed location and can be used, for example, as reference points for determining other locations. It should be appreciated that, although some of the below-outlined embodiments are directed toward survey monuments and particular uses of survey monuments, the disclosed invention is usable with any object that has at least a substantially fixed, known location. For example, in various exemplary embodiments, instead of or in addition to using survey monuments, the disclosed invention may function as a monument to identify a bridge, a building, a portion of a rail road or a signpost. It should also be appreciated that the fixed location of the monument may be relative to a moving object (e.g., a monument may be provided for determining the settling of a structure or land). Likewise, the disclosed monuments may be utilized to identify the locations, specifications or other data relating to buried transformers, cables, conduits and the like.

As outlined above, traditional survey monuments can be difficult to locate and/or difficult to identify. Traditional survey monuments are typically identified using a magnetic locator. The magnetic locator emits an audible signal related to the strength of a magnetic field in the area of the locator. A surveyor can thus identify a magnetic object below the ground based on the signal emitted by the locator. However, survey monuments may not be the only buried objects in the area that exhibit a magnetic field. Generally, there is no simple way of identifying whether a specific object is a survey monument, as opposed to, for example, a buried cable, a buried conduit, a buried unexploded ordinance, or other buried ferrous objects.

In various exemplary embodiments of a monument according to this invention, the monument includes an electronic marker (e.g., an RFID tag), which may be utilized to help identify the monument. Such identification may be related to identifying the monument as a survey monument (as opposed to, for example, some other buried ferrous object) or identifying a specific monument (as opposed to any other monument).

In various exemplary embodiments, the electronic tag or marker is an RFID tag and includes an RFID transceiver and an antenna. In various exemplary embodiments, the RFID tag is a passive RFID tag and does not require a separate power source. In various exemplary embodiments, the RFID tag is an active RFID tag and includes its own power source (e.g., a battery, a photovoltaic cell, etc.). Such active RFID tags may be particularly useful for penetrating metal or other RF-resistant materials provided on or around the RFID tag.

The RFID tag may respond to a radio frequency (RF) signal (e.g., a series of radio frequency pulses) transmitted from an RFID reader. In response to the RF signal, the RFID tag may transmit an RF signal back to the reader. The RF signal transmitted by the RFID tag may include any information stored on the RFID tag. For example, the RF signal may include an identification number that identifies the specific RFID tag, and thus the specific monument or other asset associated with that RFID tag (e.g., a permanently locked alphanumeric number of a standard length), a geographic position of the RFID tag and/or the survey marker (e.g., GPS coordinates, latitude and longitude readings, Public Land Survey System (PLSS) coordinates, etc.), information about the date the monument was placed and/or updated, who placed the monument, who last updated the information associated with the monument and/or any other desired information. Additionally, the RFID tag may be able to receive information from the RFID reader and encode that information into a memory of the RFID tag.

FIG. 1 shows a series of perspective views of exemplary survey monuments. As shown in FIG. 1, the survey monuments may include, for example, a drivable monument 102 (e.g., a survey monument that has a housing of a form (e.g., shape) that is particularly useful for driving into the ground using any known or later-developed methods and tools usable by a person having ordinary skill in the art); an anchored monument 104, which may have a housing that includes one or more flared flanges 105; a breakaway monument 106, which may have a housing that includes a portion 107 that may break away from the rest of the housing if the monument is forcibly removed from the ground or otherwise disturbed from its location; a low profile monument 108; a disc-shaped monument; and/or any other known or later-developed types and/or shapes of monuments usable for surveying, asset management and/or geographic sciences. Additionally, objects that are not traditionally identified as monuments may be utilized. In general, the monument may be any object that maintains a substantially fixed geographic location (relative to the earth or any other desired reference point) and is subsequently desirably located and/or identified.

FIGS. 2-4 show a series of views of a portion of a monument 200 (e.g., a drivable monument generally similar to survey monuments 102, 104 and 106 shown in FIG. 1) fitted with an electronic tag 300 according to an exemplary embodiment. As shown in FIG. 2, the monument 200 comprises a housing 205 having a generally tube-shaped body or body portion 210 and a cap 220. In various exemplary embodiments, the tube-shaped portion 210 is a hollow, metal cylinder or pole with an internal void 212 (as shown in FIG. 4). The monument 200 also includes a cover 230. As shown in FIG. 4, in various exemplary embodiments, one or more slots 216 are provided in the tube-shaped portion 210 of the monument 200. It should be appreciated that the slots 216 may be created during the formation of the tube-shaped portion 210, cut out of the tube-shaped portion 210 at some later time, and/or provided in any other known or later-developed manner.

As shown in FIG. 3, the monument 200 includes a magnet 222, which may be supported, incorporated into or otherwise associated with the cap 220. As outlined above, the magnet 222 is usable to help locate the monument 200 using any known or later-developed equipment and/or method for locating magnetic objects (e.g., buried survey monuments). The electronic tag 300 (e.g. an RFID tag) is provided in the internal void 212 of the tube-shaped portion 210. In an exemplary embodiment, the electronic tag 300 includes a metal backing plate or bracket 310. As shown in FIGS. 3 and 4, one or more rivets, bolts, screws or the like may be provided that extend between two of the one or more slots 216 and through the electronic tag 300 and/or bracket 310 to secure the electronic tag 300 and/or bracket to the housing 205 (e.g., to the tube-shaped portion 210) of the monument 200. It should be appreciated that any known or later-developed fastener, adhesive, or the like may be used to secure the electronic tag 300 to the bracket 310 and/or the housing 205 of the monument 200. For the purposes of this application, all such fasteners, adhesives or the like will be considered part of the housing of the monuments.

Figure 5:
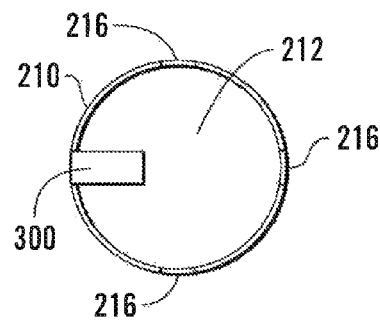
FIG. 5 is a top plan view of an exemplary monument fitted with an electronic tag according to a second exemplary embodiment.

FIG. 5 shows a top view (with the cap 220 removed) of a second exemplary method for securing the electronic tag 300 to the housing 205 of the monument 200 (e.g., to the tube-shaped portion 210). As shown in FIG. 5, the electronic tag 300 may be glued or otherwise secured to one or more of the slots 216 of the tube-shaped portion 210 of the monument 200. It should be appreciated that the electronic tag 300 may be any suitable size or shape. Likewise, two or more electronic tags may be provided in the one or more slots 216. It should also be appreciated that the slots 216 may act as wave guides to promote the penetration of signals (e.g., RF signals to and/or from the electronic tag 300).

In various exemplary embodiments, the electronic tag 300 may be positioned such that it is flush to an external surface of the tube-shaped portion 210 and/or other portions of the housing 205 of the monument 200. It should be appreciated that it may be desirable for the electronic tag 300 to be flush with the external surface of the tube-shaped portion 210 to permit the electronic tag 300, or an antenna of the electronic tag 300, to be optimally exposed to external RF or other electronic signals.

Figure 6:
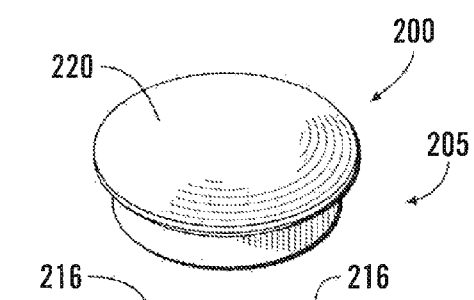
FIG. 6 is a perspective partially exploded view of the monument shown in FIG. 5.
Figure 6:
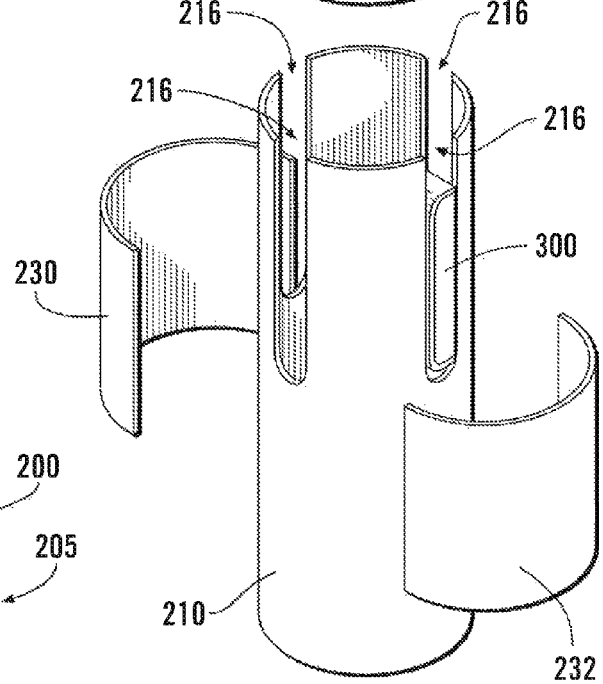
Figure 7:
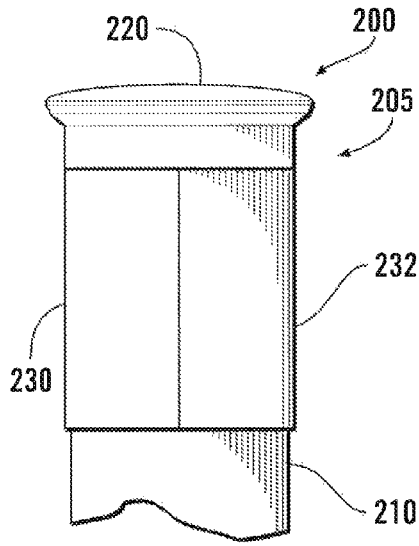
FIG. 7 is an assembled side plan view of the monument shown in FIGS. 5 and 6.

FIG. 6 shows a partially exploded, perspective view of a portion of the monument shown in FIG. 5. FIG. 7 shows a side plan view of a portion of the monument shown in FIG. 5 (after assembly). As shown in FIG. 6, a cap 220 (e.g., a conventional brass cap similar to those used on traditional survey monuments) may be placed over the end of the tube-shaped portion 210 of the monument 200 and may cover at least a portion of the one or more slots 216. It should be appreciated that, in various exemplary embodiments, at least a portion of the electronic tags 300 will be visible below the bottom of the cap 220, such that at least an antenna of the electronic tag 300 is exposed through the slot 216.

As shown in FIGS. 6 and 7, in various exemplary embodiments, a cover 230 is provided over the outer surface of a portion of the housing 205 (e.g., around the tube-shaped portion 210) of the monument 200. As shown in FIG. 7, the cover 230 may separate the one or more slots 216 from the external environment. In various exemplary embodiments, the cover 230 helps provide a hermetic seal that protects the electronic tag 300 from the conditions of the external environment (e.g., moisture). It should be appreciated that the cover 230 is generally made of an RF permeable material (e.g., a material that allows RF waves of a desired wavelength to pass through the material). In this manner, the electronic tag 300 may be sealed from the external environment, yet accessible for communication with electronic equipment using RF waves of a desired wavelength.

It should be appreciated that the cover 230 may be a single piece (e.g., a sleeve around the tube shaped portion 210) or may be comprised of one or more portions (e.g., the portions 230 and 232 shown in FIGS. 6 and 7) that interconnect to separate the one or more slots 216 from the external environment. Likewise, it should be appreciated that multiple covers may be provided to separate any one or more of the one or more slots 216 from the external environment.

Figure 8:
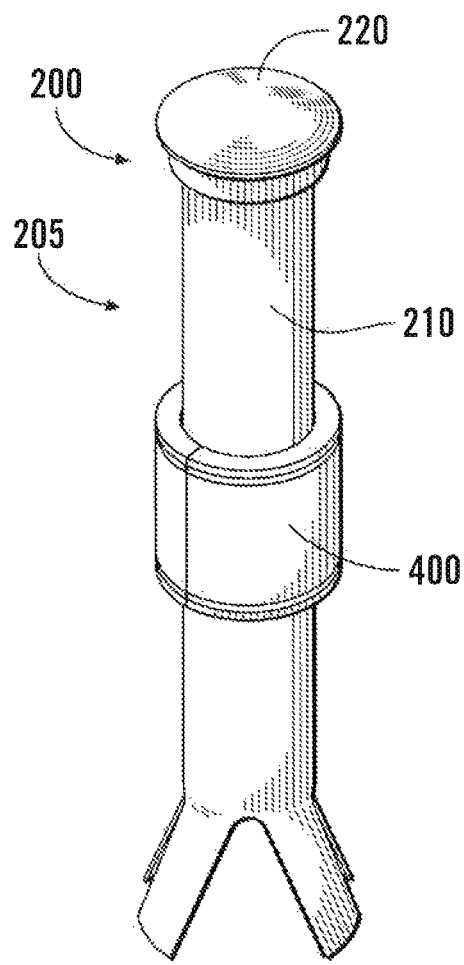
FIG. 8 is a perspective view of a monument with an upgrade sleeve according to an exemplary embodiment.

FIG. 8 shows an exemplary embodiment of a monument 200 (e.g., an anchored monument similar to the anchored survey monument 104 shown in FIG. 1) with an upgrade sleeve 400. The upgrade sleeve 400 is usable to attach an electronic tag (not shown) to a housing 205 of a pre-existing monument 200. It should be appreciated that the monument 200 may be any of the herein-outlined or other known or later-developed exemplary embodiments of monuments. It should also be appreciated that the electronic tag may be incorporated into a portion of the upgrade sleeve 400 and/or secured between the upgrade sleeve 400 and the monument 200. For example, the electronic tag may be provided on the outer surface of the housing 205 of the monument 200 and the upgrade sleeve 400 provided over the electronic tag. As such, the upgrade sleeve 400 helps to attach the electronic tag to the housing 205 of the monument 200 (e.g., to a tube-shaped portion 210 of the monument 200) and/or to protect the electronic tag without requiring significant structural changes to the monument 200. It should be appreciated that the upgrade sleeve 400 may be shaped or adapted to conform to the outer surface of any portion of the housing 205 of the monument 200.

Figure 9:
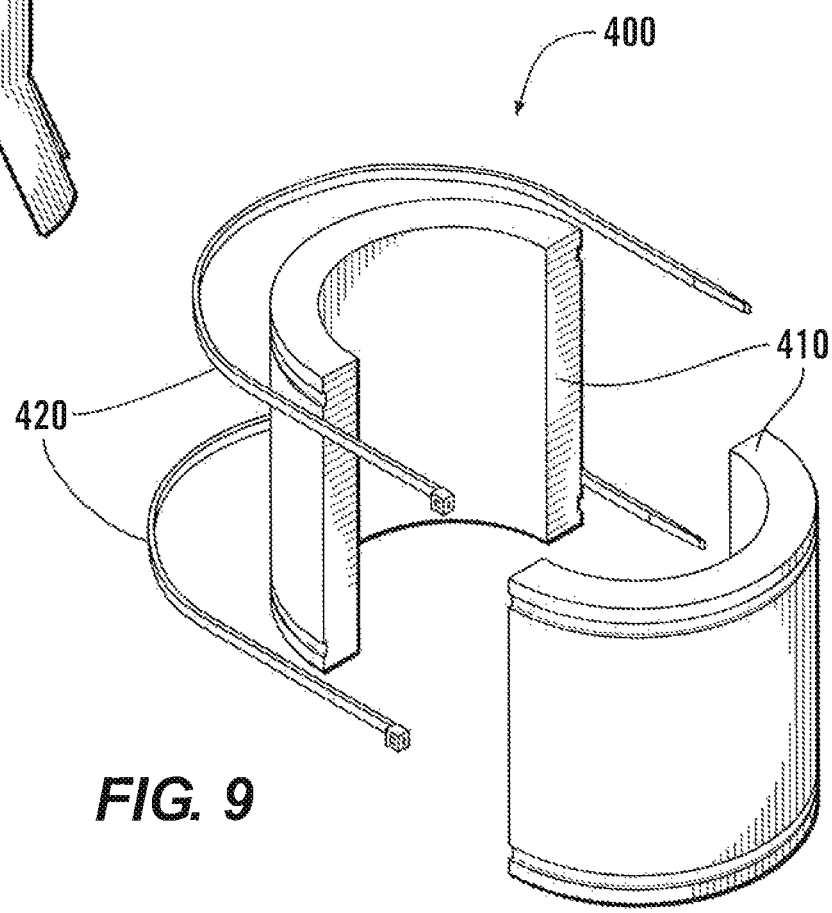
FIG. 9 is a perspective view of an upgrade kit according to an exemplary embodiment.

FIG. 9 shows an exemplary embodiment of the upgrade sleeve 400. The exemplary upgrade sleeve 400 includes one or more portions 410 and one or more ties 420. In the exemplary embodiment shown in FIG. 9, the portions 410 can be combined to provide a cylindrical collar that fits around the housing 205 (e.g., the tube-shaped portion 210 or an outer surface) of the monument 200, as shown in FIG. 8. The one or more ties 420 are usable to secure the portions 410 together around the monument 200. It should be appreciated that the ties 420 may be replaced with any appropriate known or later-developed material, apparatus or method that is usable to connect the portions 410 of the upgrade sleeve 400 together (e.g., in a ring around the monument 200). For example, the ties 420 may be replaced with screws, nuts, bolts, glue, epoxy, sonic welding, a tongue and groove style connection and/or any other material, apparatus or method usable to connect the portions 410 together. Likewise, the upgrade sleeve 400 may be a single cylindrical-shaped sleeve that fits around, and secures to, the housing 205 of the monument 200. Once so secured, for the purposes of this application, the upgrade sleeve 400 becomes a portion of the housing 205. It should be appreciated that, in various exemplary embodiments, the upgrade sleeve 400 may not encircle or surround the monument 200. In various exemplary embodiments, the upgrade sleeve 400 may be attached to one side of the monument 200 and may include a U-bolt, clamp or the like that secures and incorporates the upgrade sleeve 400 as part of the housing 205 of the monument 200.

Figure 10:
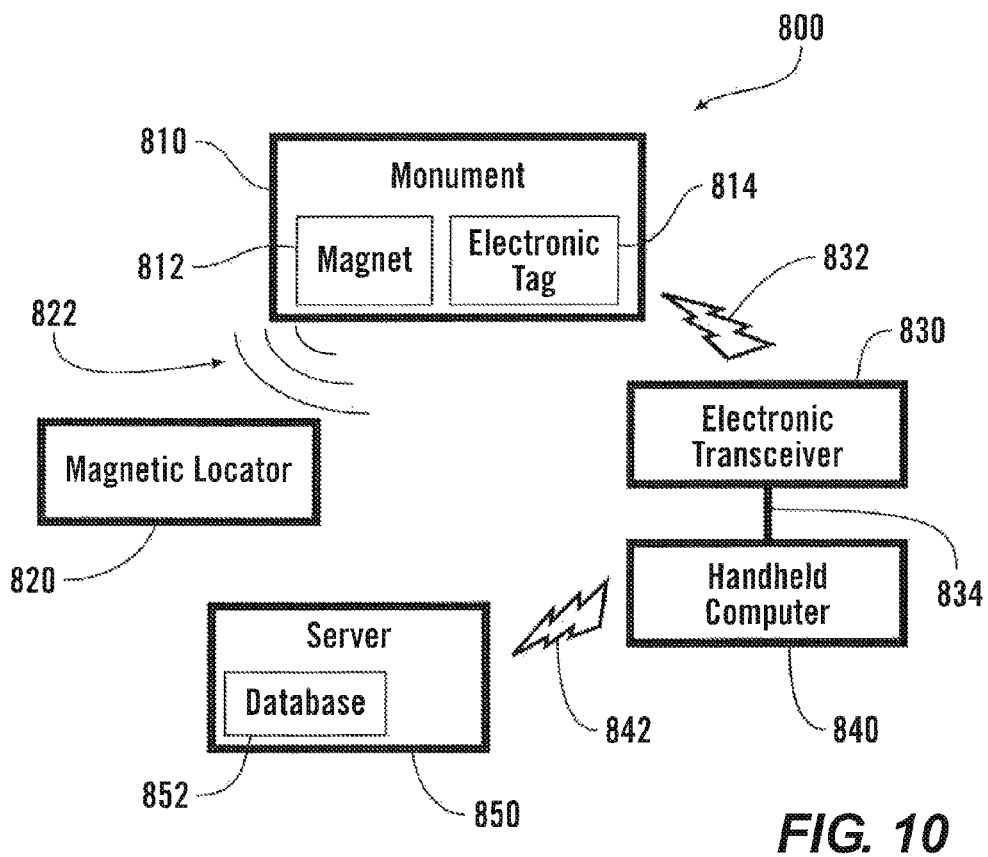
FIG. 10 is a schematic block diagram of a system, which includes an exemplary monument, according to an exemplary embodiment.

FIG. 10 shows a block diagram of a location system 800. As shown in FIG. 10, the location system 800 includes at least one monument 810, which may be any of the herein-disclosed monuments and/or any other known or later developed suitable monuments. The monument 810 is placed in a desired location which is to be later located and/or identified (e.g., buried at the location of an asset, attached to an asset, buried at a desired reference point, etc.). In general, the monument 810 is usable to mark a location and/or an object (e.g., by being buried at a desired location, attached to a desired object, or embedded in a desired structure). The monument 810 includes a magnet 812 and an electronic tag 814. In various exemplary embodiments at least one of the magnet 812 and the electronic tag 814 is attached to a housing of the monument 810. In various exemplary embodiments at least one of the magnet 812 and the electronic tag 814 is contained within the interior of the housing of the monument 810.

A magnetic locator 820 is usable to perceive (e.g., detect or measure) a magnetic field 822 emitted by the magnet 812. As outlined above, by perceiving the magnetic field 822 of the magnet 812, the magnetic locator 820 may be used to locate the monument 810 even if the monument 810 is not visible (e.g., as when the monument 810 is buried below ground). In various exemplary embodiments, the magnetic locator 820 can be used to quickly determine a location where the emitted magnetic field 822 is at its maximum and which relates to a location of the monument 810 (e.g., the magnetic field 822 will generally be larger when the magnetic locator 820 is closer to the monument 810 and thus will reach a maximum when placed directly above a buried monument 810).

An electronic transceiver 830 is usable to send and receive electronic signals 832 to and from the electronic tag 814. In various exemplary embodiments, the electronic tag 814 is an RFID tag and the electronic transceiver is an RFID reader. In such exemplary embodiments, the RFID reader sends a signal (e.g., a series of pulses) to the RFID tag and the RFID tag responds with a signal. It should be appreciated that the RFID tag may be a passive RFID tag (e.g., powered by the signal sent from the RFID reader) or an active RFID tag (e.g., an RFID tag that includes its own power supply).

The electronic transceiver 830 is in communication with a handheld computer 840. In the embodiment shown in FIG. 10, the electronic transceiver is connected to the handheld computer 840 via a wired connection 834. However, it should be appreciated that in various other exemplary embodiments the electronic transceiver 830 may be wirelessly connected to the handheld computer 840, while in still other exemplary embodiments, the electronic transceiver 830 and the handheld computer 840 are the same device or elements of the same device (e.g., the handheld computer 840 may include the electronic transceiver 830).

The handheld computer 840 is in communication with a server 850. In the embodiment shown in FIG. 10, the handheld computer utilizes wireless link 842 to communicate with the server 842. It should be appreciated that the wireless link 842 may be any known or later-developed wireless communication link (e.g., a cellular data network, a Bluetooth connection, etc.). Likewise, the wireless link 842 may be replaced with a wired connection such as, for example, an RS-232 serial connection, an I2E serial connection, and/or any other known or later developed connection suitable for providing communication between the handheld computer 840 and the server 850. Additionally, it should be appreciated that the server 850 may be combined with the handheld computer 840 in a single device. That is, rather than a traditional external server, the handheld computer 840 may utilize internal memory, processing, data storage and the like to perform the functions of a server 850.

In the exemplary embodiment shown in FIG. 10, the server 850 includes a database 852. The database 852 may be usable to store information via any known or later-developed architecture. In various exemplary embodiments, the database 852 will store information that relates to one or more monuments 810 that can be located with the magnetic locator 820 and communicated with via the electronic transceiver 830. In various exemplary embodiments, a unique identification number is stored on the electronic tag 814 of one or more monument 810. In such exemplary embodiments, the unique identification number may be usable to query relevant information stored in the database 852 of the server 850. For example, in various exemplary embodiments, the database 852 may contain information about the service history of several monuments 810 including a unique identification number for each monument 810. In such exemplary embodiments, when the electronic transceiver 830 receives the unique identification number from the electronic tag 814 of a particular monument 810, the handheld computer 840 may be used to query the service history of that particular monument 810 by sending the unique identification number of the particular monument 810 to the server 850.

In an exemplary method of using the location system 800, a user probes a desired area (e.g., an area with one or more buried monuments 810) with the magnetic locator 820 until the magnetic locator 820 registers a maximum of a magnetic field (e.g., when the magnetic locator is directly above a buried monument 810). The user then utilizes the electronic transceiver 830 to confirm the identity and send a signal to the electronic tag 814 of the located monument 814). The electronic tag 814 responds with a signal that relates to desired information about the located monument 814 (e.g., a unique identification number). In turn, the handheld computer 840 communicates with the server 850 to retrieve relevant information about the located monument 814.

It should be appreciated that any desired information may be stored on the server 850 and/or in the database 852. For example, the server 850 and/or the database 852 may store information related to a service history (e.g., install date, maintenance records, projected removal/replacement date, etc.) of the monument 810 and/or an object related to the monument 810. Likewise, the server 850 and/or the database 852 may store information about the location of the monument 810 and/or an object associated with the monument 810. For example, in an exemplary embodiment, the monument 810 may be attached to, or otherwise associated with, a bend, junction, valve, or the like provided in a buried pipe, conduit, or the like. In such exemplary embodiments, a service technician may be able to locate the bend, junction, valve or the like by utilizing the magnetic locator 820 to locate the monument 810 as outlined above. The service technician may then verify that the correct bend, junction, valve, or the like has been found by sending and receiving a signal to and from the electronic tag 814 using the electronic transceiver 830 in order to determine an identification number of the located bend, junction, valve or the like. The service technician may then query the server 850 and/or database 852 using the identification number to determine a service history of the bend, junction, valve or the like. Likewise, the service technician may send information related to the bend, junction, valve or the like to be stored on the server 850 and/or database 852. For example, the service technician may send the date, time and results of an inspection of the bend, junction, valve or the like to be stored in the server 850 and or database 852 to be accessible by later users inspecting the bend, junction, valve, or the like.

Figure 11:
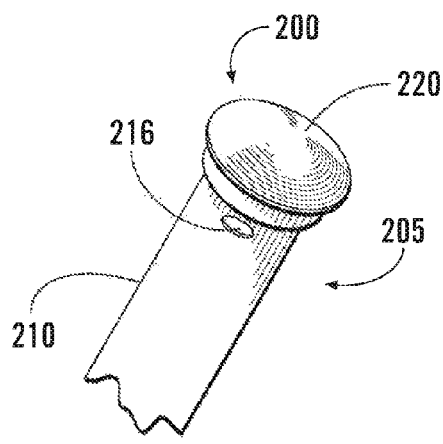
FIG. 11 is a perspective view of another exemplary embodiment of a monument fitted with an electronic tag according to any suitable embodiment.

FIG. 11 shows another exemplary embodiment of the monument 200. In the embodiment shown in FIG. 11, the housing 205 of the monument 200 includes one or more holes 216 (e.g., in the pole-shaped portion 210 of the body 205). In various exemplary embodiments, the holes 216 allow RF signals to penetrate the monument 200. In this way, if an electronic tag is placed in the internal void of the monument 200, the RF signals will be able to reach the antenna of the electronic tag.

Figure 12:
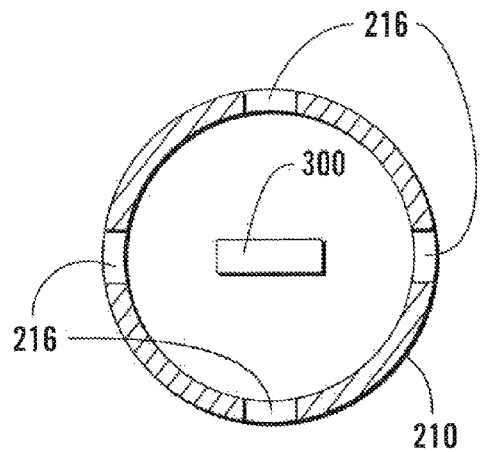
FIGS. 12-14 are a series of top cross-sectional views of monuments, such as the exemplary embodiment shown in FIG. 11.
Figure 13:
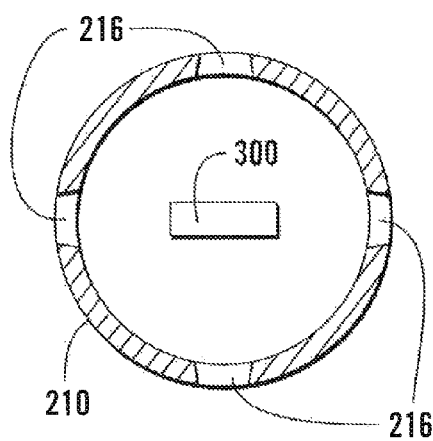
Figure 14:
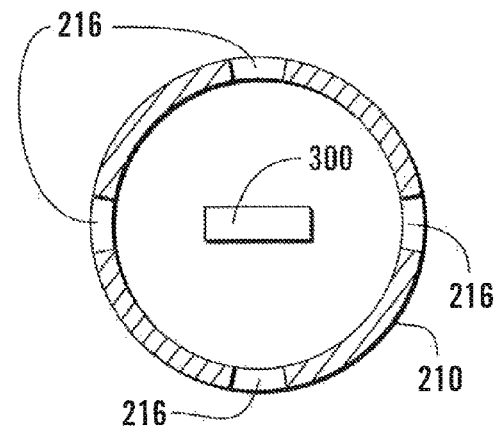

It should be appreciated that the monument 200 may include any number of slots or holes 216. FIGS. 12-14 show an exemplary embodiment including four holes 216. It should be appreciated that the shape and/or size of the slots or holes 216 may be chosen such that the slots or holes 216 act as waveguides and direct RF signals of a desired wavelength into the interior void of the monument 200. As such, if an electronic tag is placed in the interior void of the monument 200, the RF signals will be able to reach an antenna of the electronic tag. As shown in FIG. 11, a cap 220 may be provided over at least a portion of the tube-shaped portion 210 of the monument 200. It should be appreciated that, in various exemplary embodiments, the cap 220 may extend over at least a portion of one or more of the slots or holes 216. In various exemplary embodiments, at least a portion of the cap 220 is RF permeable and allows RF signals of a desired wavelength to pass through the cap 220 and the holes 216 and into the interior void of the monument 200.

Figure 17:
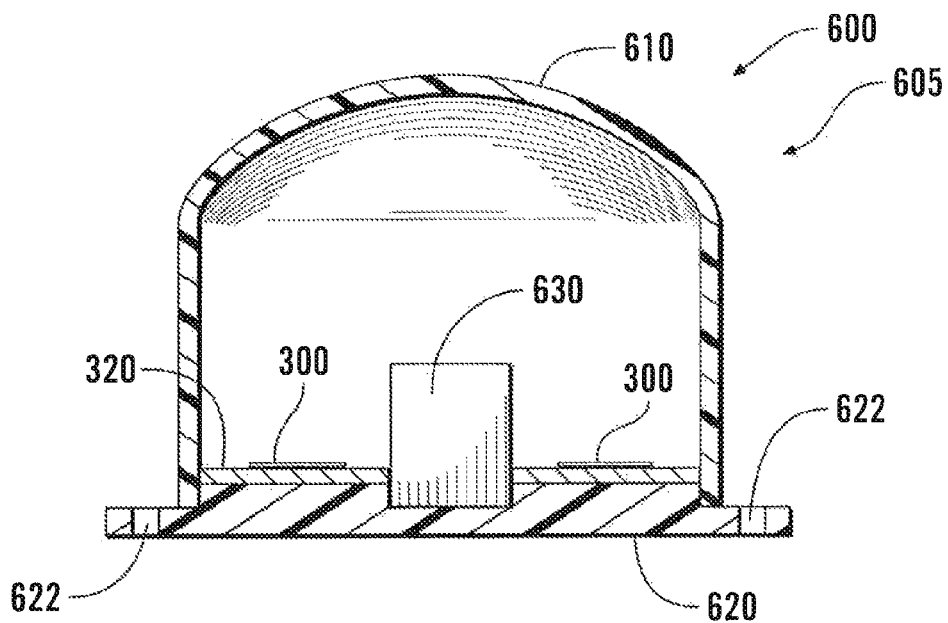
FIG. 17 is a side cross-sectional view of the monument shown in FIG. 16 fitted with electronic tags according to another exemplary embodiment.

FIGS. 12-14 show a series of cross-section views of monuments, such as the exemplary embodiments shown in FIGS. 2-7 and/or 11. An electronic tag 300 is shown in the internal void of the tube-shaped portion 210 of the monument 200. It should be appreciated that the electronic tag 300 may be attached to the housing of the monument (e.g., to the tube-shaped portion 210) according to any of the above-outlined or other exemplary embodiments. As shown in FIG. 12, the shape of the slots or holes 216 may include approximately parallel walls, such that an internal width of a given slot or hole 216 is approximately the same as an external width of that slot or hole 216. Alternatively, as shown in FIG. 13, the slots or holes 216 may include divergent walls, such that the external width of a given slot or hole 216 is smaller than the internal width of that slot or hole 216. As shown in FIG. 17, in yet another alternative embodiment, the slots or holes 216 may include convergent walls, such that the external width of a given slot or hole 216 is larger than the internal width of that slot or hole 216.

Figure 15:
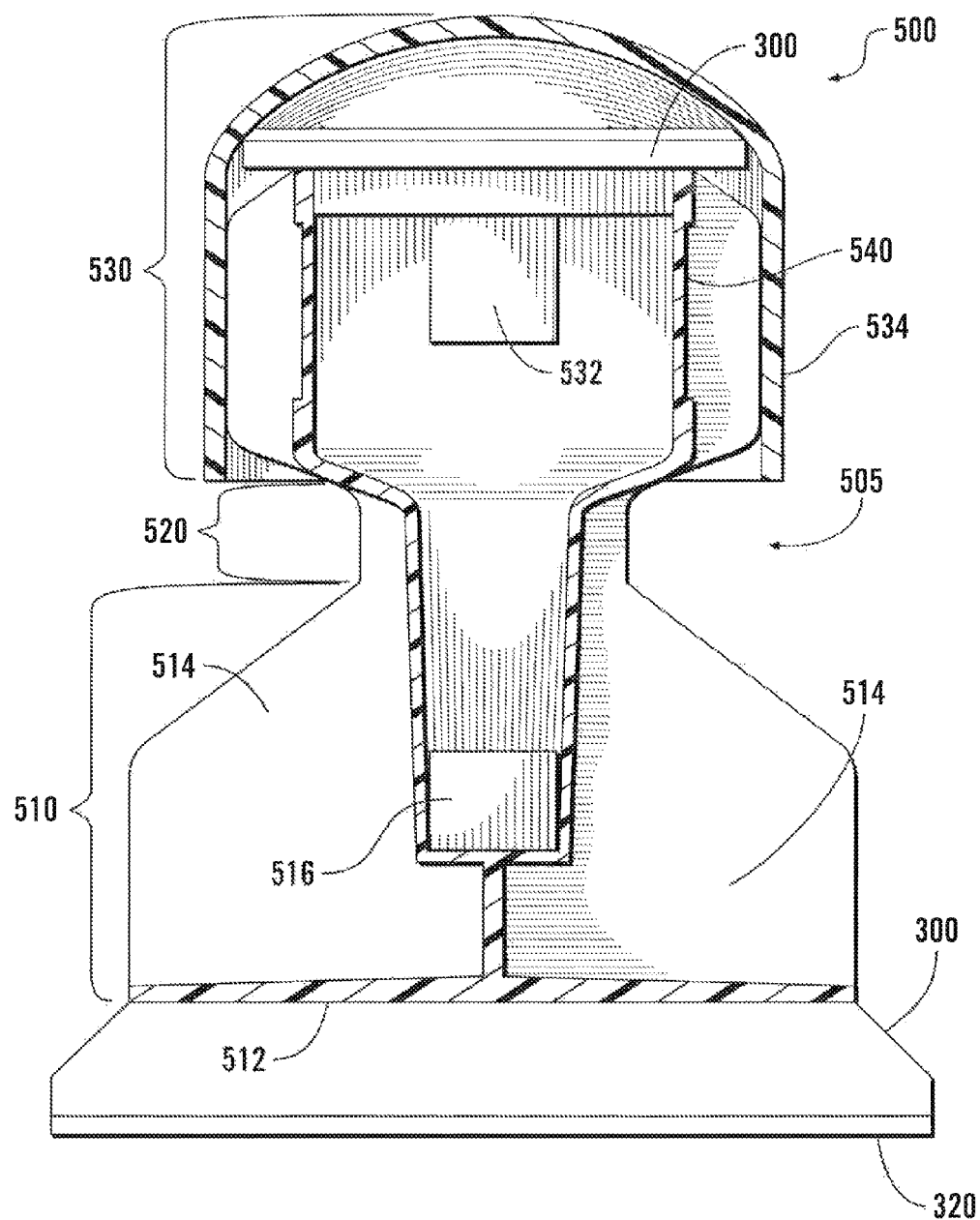
FIG. 15 is a side cross-sectional view of an exemplary embodiment of a monument fitted with electronic tags according to an exemplary embodiment.

FIG. 15 shows a partial cross-section of an exemplary breakaway monument 500. As shown in FIG. 15, the breakaway monument 500 has a housing 505 that includes a seated body portion 510, a neck 520 and a head 530. In use, the breakaway monument 500 may be buried in the ground such that the seated body portion 510 is securely embedded in the ground. If the breakaway monument 500 is disturbed (e.g., pulled out of the ground, pushed horizontally, etc.), the breakaway monument 500 may break at its neck portion 520 such that the head 530 of the breakaway monument 500 follows the disturbance while the seated body portion 510 remains in place. It should be appreciated that a tube-shaped portion (e.g., the above-outlined tube-shaped portion 210) may be provided between the upwardly opening portion 540 of the neck 520 and the head 530 of the breakaway monument (e.g., as in the breakaway survey monument 106 shown in FIG. 1).

The seated body portion 510 of the housing 505 of the breakaway monument 500 includes a base plate 512 and one or more wings 514. The base plate 512 and/or wings 514 may help secure the seated body portion 510 of the breakaway monument 500 within the ground when the breakaway monument 500 is buried. An electronic tag 300 is secured to the base plate 514 of the housing 505 of the breakaway monument 500. In the event that the breakaway monument 500 is disturbed such that the breakaway monument 500 breaks leaving only the seated body portion 510 behind, the electronic tag 300 may continue to provide the desired information relative to the breakaway monument 500 and/or the environment around the breakaway monument 500. A metal backing plate 320 is provided beneath the electronic tag 300. In various exemplary embodiments, the backing plate 320 helps improve reception and/or transmission of electronic signals by the electronic tag 300. In various exemplary embodiments, the backing plate 320 reflects some of the RF signals that pass past the electronic tag 300 back toward the electronic tag 300. Additionally, a magnet 516 is provided in the seated body portion 510 of the housing 505 of the breakaway monument 500. The magnet 516 may help locate the seated body portion 510 of the breakaway monument 500 after the monument or the overlying soil has been disturbed according to the above-outlined process.

The head portion 530 of the housing 505 of the breakaway monument 500 includes a cap 534 that separates an internal void of the monument 500 from the external environment. The head 530 of the breakaway monument 500 may also include a magnet 532 and/or an electronic tag 300.

Figure 16:
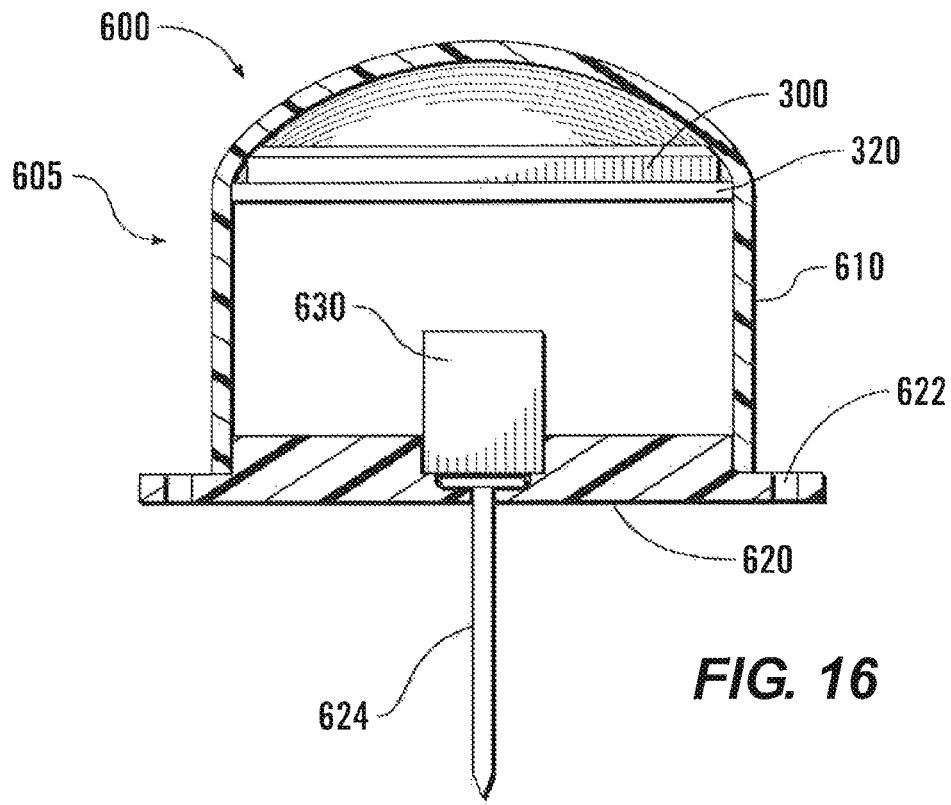
FIG. 16 is a side cross-sectional view of an exemplary embodiment of a monument fitted with an electronic tag according to an exemplary embodiment.

FIGS. 16-19 show exemplary embodiments of low profile monuments. As shown in FIGS. 16 and 17, an exemplary low profile monument 600 has a housing 605 that includes a cap 610 and a base plate body 620. The low profile monument 600 also includes a magnet 630 located within the housing 605 of the low profile monument 600. In various exemplary embodiments the base plate body 620 may include one or more holes 622. The holes 622 may help secure the low profile monument 600 to buried conduits, cables, pipes or any other known or later-developed object that may be desirably located. In the exemplary embodiment shown in FIG. 16, the base plate body 620 also includes one or more projections 624 (e.g., a nail, spike, or the like). The one or more projection 624 may be useful for securing the low profile monument 600 to a desirably located object. As shown in FIG. 16, an electronic tag 300 and a metal hacking plate 320 are attached to the cap 610 of the housing 605 of the low profile monument 600. As outlined above, the metal backing plate 320 may help improve the reception and or transmission of electronic signals to and/or from the electronic tag 300. It should be appreciated that the electronic tag 300 and/or the backing plate 320 may be secured to the cap 610 in any suitable known or later-developed way. In various exemplary embodiments, the electronic tag 300 is secured to the backing plate 320 (e.g., using one or more rivets, epoxy, adhesive, or the like) and the backing plate 320 and/or the electronic tag 300 is secured to the cap 610 (e.g., with adhesive or the like).

Figure 18:
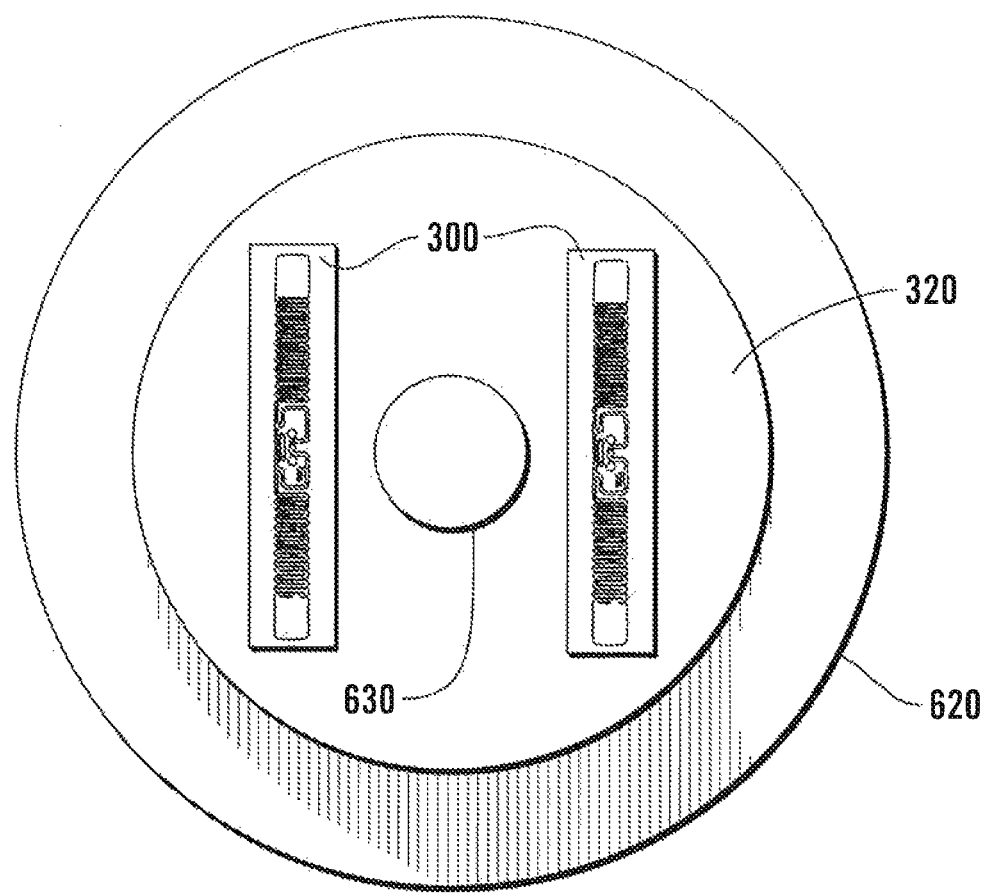
FIG. 18 is a top plan view of the monument shown in FIG. 17 with the cap removed.

As shown in FIGS. 17 and 18, one or more electronic tags 300 and/or a metal backing plate 320 may be secured to the base plate body 620 of the housing 605 of the low profile monument 600 in addition to or instead of being secured to the cap 610. It should be appreciated that the one or more electronic tags 300 may be attached to the housing 605 of the low profile monument 600 by securing the one or more tags 300 to a backing plate 320 (e.g., an aluminum or stainless steel washer) and then securing the backing plate 320 to the base plate body 620. It should be appreciated that while the one or more electronic tags 300 are shown in FIGS. 16 and 17 on either side the magnet 630 (with the magnet 630 being centrally located on the base plate 620), in various exemplary embodiments, the magnet 630 may be offset to one side of the base plate 620 and backing plate 320, and the one or more electronic tags 300 may be offset to the middle or an opposite side of the backing plate 620. The magnet pocket in the base plate body 620 and the magnet opening in the backing plate 320 would be likewise offset to whatever position is desired for the magnet 630.

Figure 19:
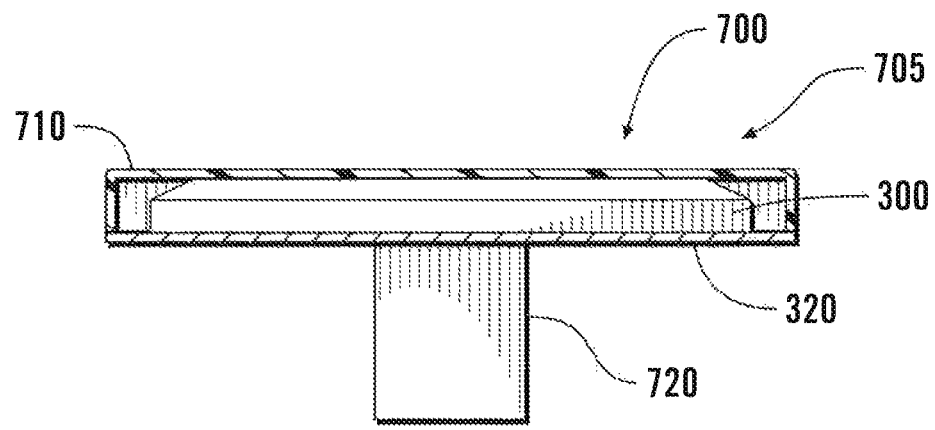
FIG. 19 is a side cross-sectional view of an exemplary embodiment of a monument fitted with an electronic tag according to an exemplary embodiment.

FIG. 19 shows another exemplary embodiment of a low profile monument 700. As shown in FIG. 19, the low profile monument has a housing 705 that includes a metal backing plate 320 and a cap 710. The low profile monument 700 also includes a magnet 720 and an electronic tag 300 secured to the housing 705 of the low profile monument 700. In the embodiment shown in FIG. 19, the electronic tag 300 is secured to the metal backing plate 320 and/or the cap 710 of the low profile monument 700 and is provided within the housing 705 of the low profile monument 700, while the magnet 620 is secured to the backing plate 320 and provided outside of the housing 705 of the low profile monument 700. The low profile monument 700 may be particularly useful as a survey monument which can be buried in the concrete or asphalt of a highway or parking lot extending over a unique geographical point, such as a section corner, where it can be quickly located by use of a magnetic locator and identified and updated without breaking up and excavating the concrete or asphalt overlay by sending an electronic signal to the electronic tag of the monument and reading and updating the information on the tag.

Figure 20:
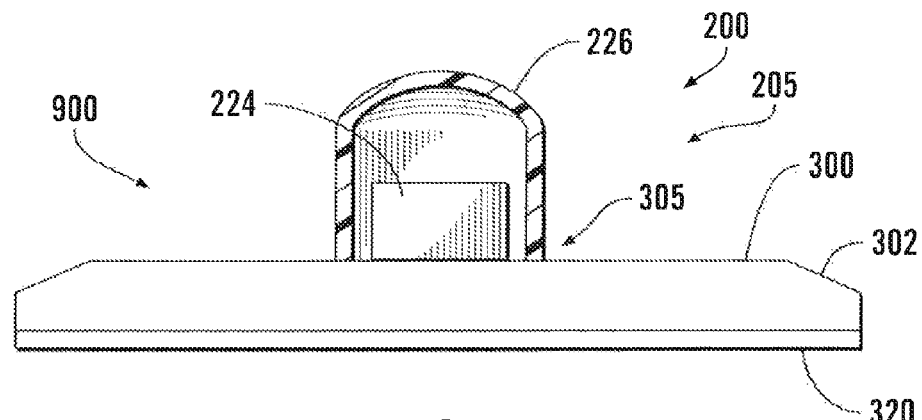
FIG. 20 is a side cross-sectional view of an exemplary embodiment of a monument including an electronic tag according to an exemplary embodiment.

FIG. 20 shows another exemplary embodiment of a monument 200 comprising an electronic tag 300 having an outer body portion 302 which comprises a portion of a housing 205 of the monument 200. As shown in FIG. 20, a reflector plate 320 is secured to the lower surface of the housing 205. A cap 226 is attached to the housing 205 and a magnet 224 is provided within the cap 226. In various exemplary embodiments, the magnet 224 is also attached to the body portion 302 of the housing 305 of the electronic tag 300.

In various exemplary embodiments, each of the above outlined electronic tags (e.g., the electronic tag 300) includes a memory that stores an identification number of that electronic tag. In various exemplary embodiments, the identification numbers of each RFID tag are associated with information stored in a database. The database may include information about the tag and/or the geographical location around the tag. For example, the database may include information about land rights (e.g., boundaries of ownership), global positioning system coordinates of the monument, other known buried objects in the area (including other ferrous objects), information regarding previous inspections of the area and/or any other known or later-developed information.

In various exemplary embodiments, some or all of the information stored on the electronic tags is electronically locked (e.g., permanently or via one or more security protocols) to, for example, reduce or prevent counterfeiting and/or tampering.

Additionally, the identification number of the electronic tag can be used to verify that an individual visited the site. For example, the reader used by a surveyor may keep records of recently read monuments to verify that the surveyor in fact actually visited the location of the surveying monuments. Likewise, individuals that are required to patrol various locations (e.g., border patrol, security guards, etc.) may carry a portable or vehicle-mounted reader that locates and automatically interacts with asset monuments in the vicinity of the individual and stores information obtained from those monuments. After completing the required patrol route, the identification numbers or other information can be used to verify that the individual traveled through the required area.

In various exemplary embodiments, the reader is connected (e.g., via wired or wireless network, such as, for example, over a cellular network, a Wi-Fi network, wireless internet connection or the like) to a server that includes the database. In various exemplary embodiments, the reader can display information received from the server and related to an electronic tag read by the reader.

In one exemplary embodiment of a method for interacting with a survey monument that includes an electronic tag, a surveyor locates the general location of a survey monument using, for example, a land survey map. The surveyor may then quickly locate and identify the survey monument using a magnetic locator aimed in the general location of the survey monument. He may then confirm the identity of the monument by sending an electronic signal to the monument using an RFID transceiver (RFID reader). The RFID reader may then display useful information to the surveyor, such as, for example, the type of survey monument, the location of the monument, as identified by a global navigation satellite system (e.g., GPS, Galileo, etc.), the location and type of other known objects (ferrous and/or otherwise) in the area, such as objects that may interfere with a magnetic locator, land rights, property boundary lines, easement boundaries and the like for the area and/or any other known or later-developed types of information desirably related to or associated with the location of the survey monument.

The surveyor may then take any appropriate action as dictated by the information received from the server, may update information on the server in response to observed or otherwise known changes in the area associated with the surveying monument and/or may update information stored on the electronic tag of the surveying monument.

In other exemplary methods for interacting with a located monument that includes an electronic tag, such interaction may be related to, for example, inspection, record keeping and/or verification of site visits. For example, that interaction may be related to bridge inspections, tunnel inspections, rail inspections, dam monitoring, telephone pedestal monitoring, gas transmission monitoring, elevator maintenance, traffic light maintenance, highway sign record keeping, forestry record keeping, commodity record keeping (e.g., crops, petroleum, natural gas, mineral exploration, etc.), HVAC servicing, parks and recreation site visits and the like.

Likewise, any service, technology or industry that can utilize location-based information may utilize variants of the above outlined surveying systems. In various exemplary embodiments, the information stored in the database may be related to other city-planning, civil engineering and/or geographic management services. For example, business models may utilize location-based markers to identify local community needs and services in relation to population.

Further, in various exemplary embodiments, the above-outlined surveying system is incorporated into and/or includes other geographic information systems (GIS) and/or software. For example, the above-outlined surveying system may be incorporated into or otherwise compatible with known or later-developed GIS software such as that available from ESRI of Redlands, Calif.

A surveying system includes a monument with a permanent magnet and an electronically accessible tag or memory, a magnetic locator, an electronic reader and a server. The magnetic locator is usable to quickly locate the monument. The reader is usable to identify the monument by electronically interacting with the tag or memory. The reader is also usable to receive information from the tag or memory. The reader is in communication with the server. The server includes at least one database that stores information related to the monument. The reader is usable to send the information received from the electronic tag or memory of the monument to the server and in return receives information related to the monument from the server. The reader may also be usable to add to, subtract from and/or alter the information stored in the electronic tag or memory.

A server includes at least one database. The database includes information related to a geographical location or fixed asset identified by at least one monument. Upon receiving information identifying one such monument, the server outputs at least some of the information related to that monument and/or the geographical location or fixed asset identified by that monument.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

I claim:

1. A monument for locating stationary geographical positions and assets comprising:
    a housing;
    at least one permanent magnet provided on the housing and having a magnetic field of sufficient strength for a location of the at least one magnet relative to a portable magnetic locator to be readily identified from outside the housing the portable magnetic locator; and
    at least one electronic marker coupled to a metal backing plate and provided on the housing, the at least one electronic marker for receiving and/or transmitting one or more radio frequency (RF) signals which include information unique to a geographical location and/or a functional property of a monument or an asset associated with the monument, wherein the electronic marker is adapted to transmit and/or receive the one or more radio frequency (RF) signals in the presence of the magnetic field of the permanent magnet;
    wherein the at least one permanent magnet and the at least one electronic marker are each positioned within the housing;
    at least one of a body and a cap of the housing is formed of metal or other material resistant to the passage of electronic frequencies, the body including at least one opening adjacent to the at least one electronic marker for facilitating passage of the one or more radio frequency (RF) signals from and to the electronic marker; and
    wherein the at least one electronic marker comprises an RFID tag and the at least one opening in the body and the material of a cover attachable to the body in a position covering at least a portion of the at least one opening permits the passage of RFID signals from and to the RFID tag.

2. The monument of claim 1, wherein the at least one RFID tag is a passive RFID tag and includes an RFID transceiver and an antenna.

3. The monument of claim 1, wherein the at least one RFID tag is an active RFID tag and includes a transceiver, an antenna and a power source.

4. The monument of claim 3, wherein the power source may be selected from the group including a battery and a solar cell.

* * * * *